No. 865,793. PATENTED SEPT. 10, 1907.
E. MORRISON.
APPARATUS FOR MAKING SUCRATE OF LIME.
APPLICATION FILED NOV. 1, 1905.
2 SHEETS—SHEET 1.
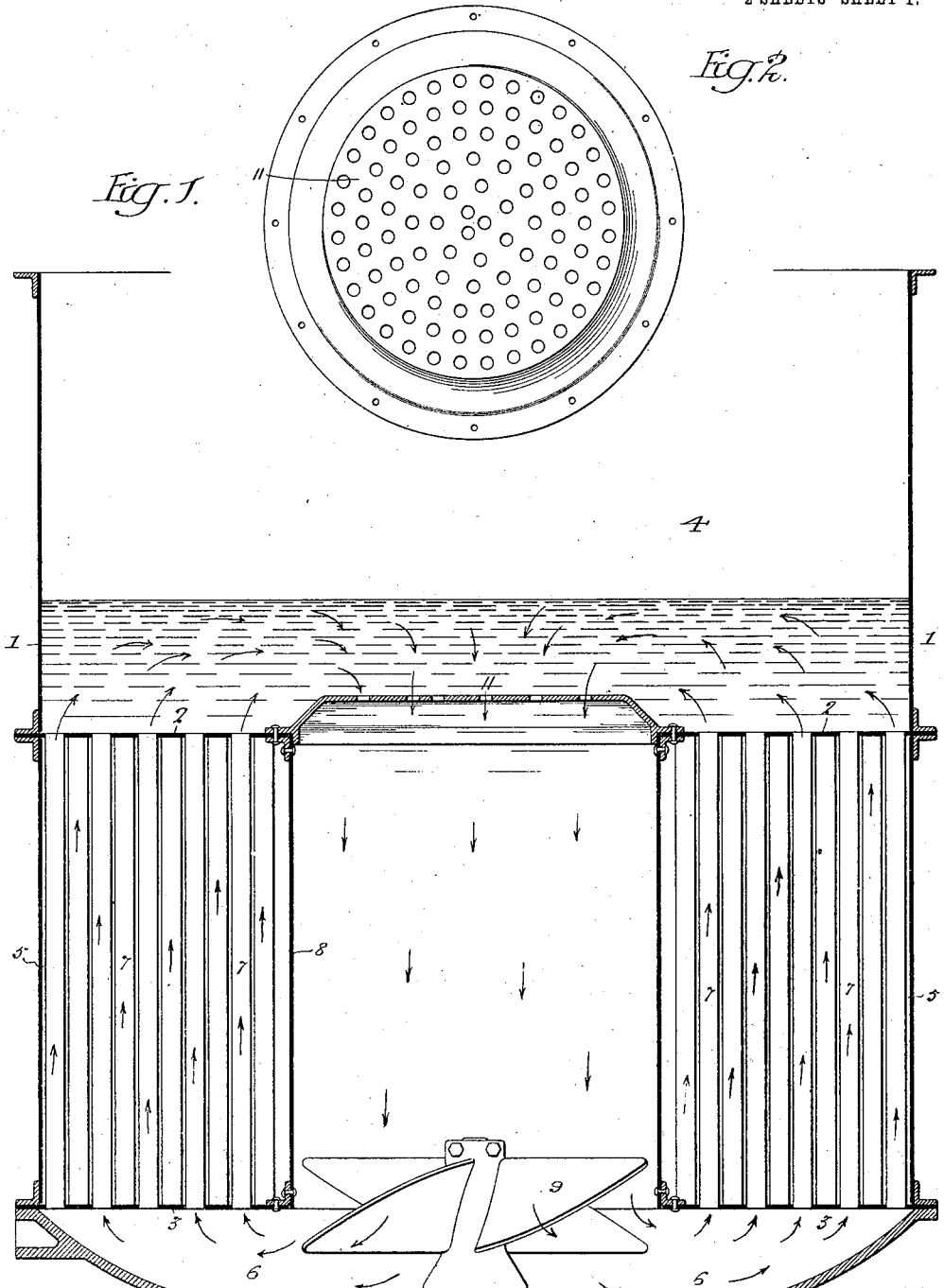

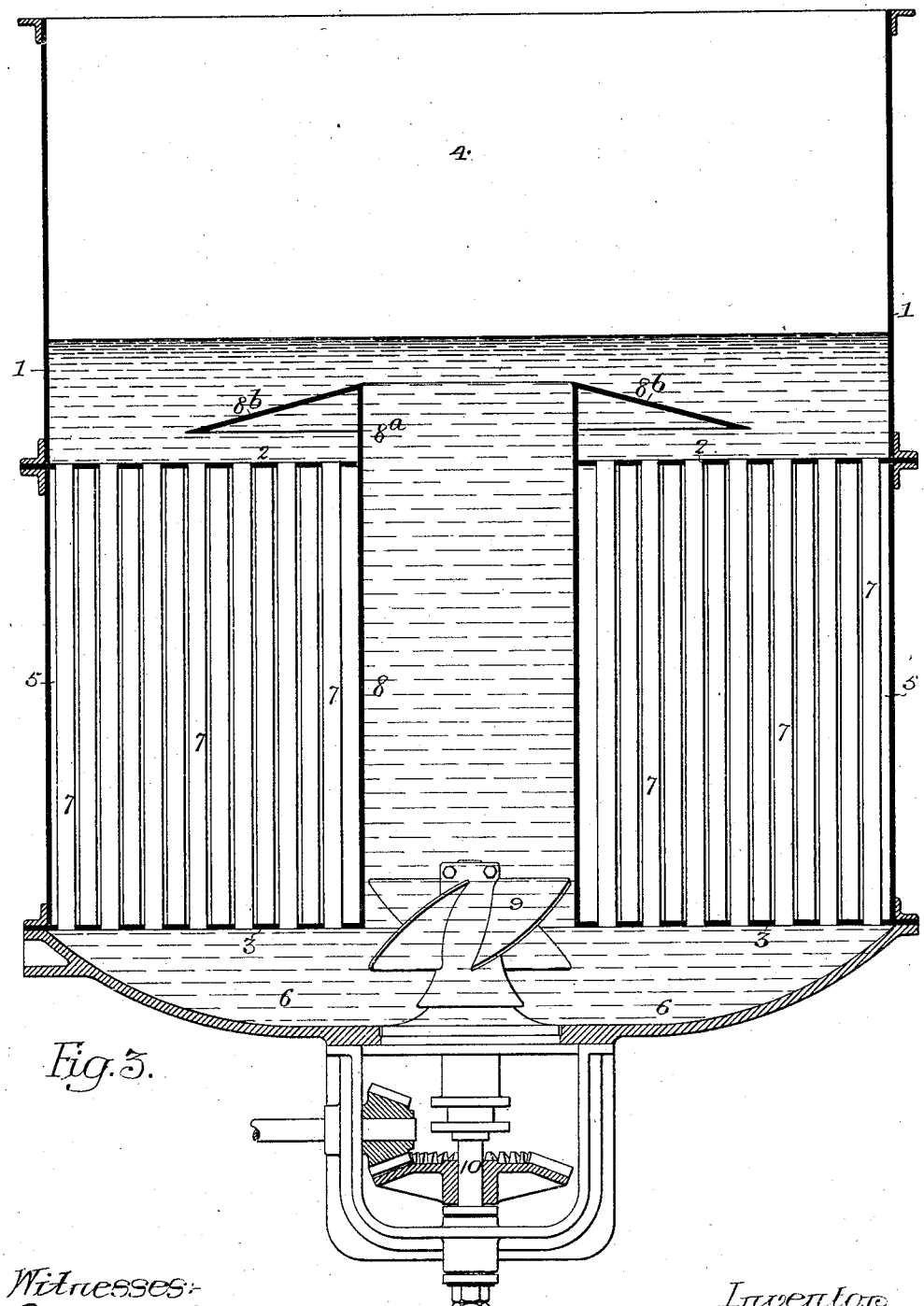

UNITED STATES PATENT OFFICE.

EDWIN MORRISON, OF FORT COLLINS, COLORADO, ASSIGNOR TO THE AMERICAN SUGAR REFINING COMPANY, OF JERSEY CITY, NEW JERSEY, A CORPORATION OF NEW JERSEY.

APPARATUS FOR MAKING SUCRATE OF LIME.

No. 865,793.     Specification of Letters Patent.     Patented Sept. 10, 1907.

Application filed November 1, 1905. Serial No. 285,470.

*To all whom it may concern:*

Be it known that I, EDWIN MORRISON, a citizen of the United States, and a resident of Fort Collins, Colorado, have invented certain Improvements in Apparatus for Making Sucrate of Lime, of which the following is a specification.

My invention relates to that class of apparatus in which molasses solution is caused to circulate through a cooler and, while thus circulating, has added to it finely powdered lime, the object of my invention being to accomplish, without the formation of foam, the rapid movement of all portions of the solution and especially of the surface portion upon which the powdered lime is deposited. This object I attain in the manner hereinafter set forth, reference being had to the accompanying drawing, in which Figure 1, is a vertical sectional view of apparatus for making sucrate of lime, constructed in accordance with my invention; Fig 2, is a plan view of part of the same; and Fig. 3, is a vertical sectional view illustrating a modified form of the apparatus.

1 represents a vessel or tank, usually of cylindrical form and separated by transverse partitions 2 and 3 into three chambers, 4, 5 and 6, the chamber 5 being intended for the reception of the cooling fluid, and being crossed by vertical tubes 7, which provide communication between the upper and lower chambers 4 and 6; the upper chamber serving as a mixing chamber, and further communication between these chambers being furnished by a central well 8, at the base of which is a screw propeller 9, mounted upon a vertical shaft 10, the latter being adapted to suitable bearings carried by the bottom of the tank 1 and rotated at the proper speed by gearing below said tank.

The molasses solution is deposited in the tank 1 until it reaches about the level in the mixing chamber shown in Fig. 1, and the screw propeller 9 is rotated so as to cause a circulation of said solution in the tank, the solution flowing from the upper chamber 4 into the well 8, descending in the latter and being thence forced through the chamber 6 and up through the tubes 7 of the cooling chamber 5 into the mixing chamber 4. While this circulation is being maintained the powdered lime is distributed on the surface of the molasses solution in order that it may combine with the sugar in the solution to form the sucrate, and for this reason, all of the surface of said solution must be made to move rapidly, but violent agitation, such as would be liable to cause foam, must be avoided, since the foam is apt to float upon the surface of the solution and thus prevent the powdered lime from coming into contact with the sugar, the lime which drops upon the foam accumulating until it forms a crust of sufficient weight to break through. While resting on the foam, the lime becomes hydrated and is thus prevented from reaching the sugar in the caustic condition essential to the formation of the sucrate. Circulation must, therefore, take place without splashing or drawing air into the solution, for in this way only can the formation of foam be prevented.

To accomplish my purpose, I extend the walls of the central well 8 above the upper tube sheet 2 but not sufficiently to cause them to rise above the surface of the solution, the object being to insure a rapid flow in that portion of the solution which is above the plane of the top of said extended well, which will result in constant change at the surface of the solution as it passes towards the center of the cooler, preparatory to flowing down the well. By practically bringing the whole of the solution flowing to the well either to or very near to the surface, the latter changes so rapidly that the accumulation of lime upon it is effectually prevented.

If the well is not extended in the manner described, circulation will either take place below the surface of the solution, thus leaving a dead space upon which the lime and foam accumulate, or, if the level of the solution is carried sufficiently low to prevent circulation below the surface, the agitation of the solution in the chamber 4 by that rushing upward from the tubes 7, will be so violent that air will be entrapped and foam created. This will result in the level of the solution rapidly rising owing to the increase in its volume, due to the entrapped air, and in proportion as the level rises, circulation will become less and less efficient at the surface.

By my invention, I am enabled to carry sufficient solution above the upper tube sheet to prevent the formation of foam, and I am, at the same time, able to effect that rapid flow all over the surface which is necessary to prevent the unfavorable conditions above described.

In practice, I find it sometimes desirable, owing to the proportions of the cooler, to place above the well an elevated cap having an opening or series of openings smaller in area or aggregate area than the well itself, whereby the walls of the well are virtually raised by the addition of the cap, a plurality of small openings being preferred, in order to prevent air from being drawn into the well by the downward rush of the solution, which might otherwise result in a vortex formation. Such an elevated and perforated cap is shown at 11, in Fig. 2, but it is not necessary to the broader embodiment of my invention, and in Fig. 3, I have shown a construction which may be successfully used, and which consists in running up the walls of the well to a point above the upper tube sheet as shown at $8^a$, such extension being preferably provided with an outwardly and downwardly projecting flange $8^b$, in order to direct outwardly the solution rising through the inner series of tubes 7, and cause it to combine with that rising through the outer series and flow back to the well close to the surface.

Having thus described my invention, I claim and desire to secure by Letters Patent:—

1. In apparatus for making sucrate of lime, the combination, with a tank having a cooling chamber, a well, and a mixing chamber disposed above said cooling chamber, of means for causing circulation of a molasses solution from said mixing chamber through said well and cooling chamber, the wall of said well extending above the top of the cooling chamber.

2. In apparatus for making sucrate of lime, the combination, with a tank having a cooling chamber, a well, and a mixing chamber disposed above said cooling chamber, of means for causing circulation of a molasses solution from said mixing chamber through said well and cooling chamber, the walls of said well being solid and extending above the top of the cooling chamber and inclined inwardly to reduce the area of inlet to said well.

3. In apparatus for making sucrate of lime, the combination, with a tank having a cooling chamber, a well, and a mixing chamber disposed above said cooling chamber, of means for causing circulation of a molasses solution from said mixing chamber through said well and cooling chamber, the walls of said well being solid and extending above the top of the cooling chamber, and a top or cap for said well having perforations distributed throughout the area of its horizontal surface.

4. In apparatus for making sucrate of lime, the combination, with a tank having a cooling chamber, and a mixing chamber disposed above said cooling chamber, of an inner vertical wall forming a well, and means for causing circulation of a molasses solution through said well and cooling chamber, the wall of said well extending to a point above the top of the cooling chamber.

In testimony whereof, I have signed my name to this specification, in the presence of two subscribing witnesses.

EDWIN MORRISON.

Witnesses:
RUDOLPH M. BOORAEM,
S. E. MILLER.